United States Patent Office 3,047,560
Patented July 31, 1962

---

3,047,560
SODIUM DERIVATIVES OF OCTAKIS(2-HYDROXY PROPYL) SUCROSE
Clayton D. Callihan and Samuel M. Rodgers, Jr., Midland, Mich., assignors to The Dow Chemical Company, Midland, Mich., a corporation of Delaware
No Drawing. Filed Apr. 23, 1959, Ser. No. 808,323
5 Claims. (Cl. 260—209)

The present invention relates to sodium derivatives of octakis(2-hydroxy propyl)sucrose and to a method for their preparation. The new compounds are characterized by the formula

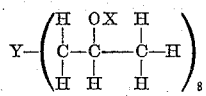

where Y represents the residue of the sucrose molecule and X represents members selected from the group consisting of hydrogen and sodium and wherein the number of sodium atoms reacted with the active hydrogen atoms of the secondary propyl alcoholic hydroxy groups can be from one to eight. These sodium derivatives have been found useful as catalysts for transesterification reactions and as stable useful intermediates for preparation of compounds having the basic component of octakis(2-hydroxy propyl)-sucrose. As examples of the latter class of reactions, the compounds easily are reacted with alkyl or aromatic halides to substitute as many of the sodium atoms present as one desires.

The compounds of the present invention are much more stable and therefore less susceptible to degradation by exposure to normal atmospheric conditions such as air, heat, light and moisture than the presently used catalysts such as sodium methylate or sodium ethylate. For example, a sample of the material of the present invention was allowed to stand overnight in a hot air circulating oven at 110° centigrade. Use of this catalyst in a transesterification reaction after this treatment gave results showing the material had undergone very little lowering of catalytic activity. Both sodium methylate and sodium ethylate after similar oven treatments were completely useless as catalysts. The present compounds offer still another advantage over the sodium methylate and ethylate. Often in transesterification reactions, the sodium atom of the catalyst becomes stripped from the molecule and is replaced by a proton. With the sodium methylate and ethylate, this leaves the volatile methyl and ethyl alcohols, which even though present in low concentrations can contaminate later distillations and separations. With the compounds of the present invention, such replacement of the sodium atoms with protons gives a non-volatile material which will not vaporize at temperatures below 160° centigrade even at an absolute pressure of 1 to 2 microns.

The compounds of the present invention may be prepared conventionally by adding to the octakis(2-hydroxy propyl)sucrose, either in the presence or absence of a suitable solvent, incremental amounts of metallic sodium. The amount of sodium added can be varied over the range of one gram atom of sodium per gram formula weight of the octakis(2-hydroxy propyl)sucrose up to the theoretical maximum of eight gram atoms of sodium per gram formula weight of this sucrose. The reaction can be carried out in the presence of solvents over the temperature range from about 25° centigrade up to reflux temperatures, and without solvent over the temperature range of about 25–125° centigrade. The time of reaction will vary directly with the amount of sodium to be reacted incrementally per molecule of the sucrose, and normally the reaction is permitted to continue for a period of time after the final addition of sodium has been made. Suitable solvents for use in carrying out the preparation are volatile organic liquids which are inert to the reactants and reaction products such as 1,3-dioxane, 1,4-dioxane, benzene, toluene, alkyl or aryl ethers and the like. Separation of the solid product from the solvent is easily accomplished by vacuum drying at about 70° centigrade. The resulting sodium substituted sucrose derivatives prepared in this manner can be used directly as produced without need of any purification.

The present invention may be illustrated further by the following examples, but is not to be construed as limited thereto.

*Example I*

776 grams of octakis(2-hydroxy propyl)sucrose were placed in a 5 liter flask equipped with a reflux condenser, a mechanical stirrer, and a heating mantle. To this sucrose were added 200 grams of 1,4-dioxane which previously had been dried with a small amount of sodium. This solution was heated to reflux temperature (103° centigrade) and a total of 70.5 grams of sodium, previously subdivided into approximately 1 gram pieces, were then added in incremental amounts of approximately 5 grams every 10 minutes. During this addition, the mixture was stirred continuously and rapidly. Stirring of the mixture and heating to maintain reflux temperature were continued for two hours after the sodium additions were completed. The resulting sodium derivative (approximately 3.4 atoms of sodium substituted per sucrose molecule) was separated from the solvent by drying for 6 hours at 70° centigrade in a high vacuum. This product was a light, greyish colored solid.

The catalytic utility of this compound was tested and proved in an interchange reaction between 170.5 grams of the monobutyl ether of propylene glycol and 276.8 grams of butyl 2,4-dichlorophenoxy acetate. Reaction of these materials at 120° centigrade and 10 millimeters absolute pressure using as catalyst 8 grams of the sodium octakis (2-hydroxy propyl)sucrose prepared above gave complete transfer, as measured by butyl alcohol release in a 5 hour reaction period. With the same amount of reactants and conditions of reaction, use of 5 grams of a 25 percent alcoholic solution of sodium methylate gave complete transesterification only after 8 hours reaction.

Similarly the interchange between 3900 grams of octakis(2-hydroxy propyl)sucrose and 1434 grams of methyl oleate at 110° centigrade and 20 millimeters absolute pressure with 16.7 grams of the present catalyst gave complete reaction in 2 hours. Repeating the study but using 8.1 grams of powdered sodium methylate gave complete transesterification only after 2¾ hours.

*Example II*

Using the same experimental techniques and preparation procedures as in Example I, 806 grams of the octakis-(2-hydroxy propyl)sucrose in 1,4-dioxane can be reacted with incremental additions of sodium (23 grams total) to produce the light grey mono-sodium substituted sucrose derivative.

*Example III*

Using the same experimental techniques and procedures as in Example I, 806 grams of the octakis(2-hydroxy propyl)sucrose in 1,4-dioxane can be reacted with incremental additions of sodium (184 grams total) to produce the octa-sodium substitutued sucrose derivative.

*Example IV*

726 grams of octakis(2-hydroxy propyl)sucrose were placed in a 5 liter flask attached to a reaction assembly as used in the compound preparation shown in Example I. The sucrose was stirred and heated to 110° centigrade. 70.5 grams of massive sodium were added directly in very small (approximately 1 gram) increments to the sucrose taking care to maintain the reaction mix temperature between 110–125° centigrade during this addition. Stirring of the mix was continued after the final addition of the sodium until the mixture set up into a firm cake of the sodium propoxy sucrose (3.4 atoms sodium per sucrose molecule). This cake was easily handled and was readily pulverized into a greyish powder suitable for use similarly as the dried compound of Example I.

*Example V*

Using the same apparatus (without heating mantle) and quantities of materials as in Example I but adding the sodium incrementally at about 25° centigrade as a finely divided dispersion in 1,4-dioxane will result in reaction at this temperature to yield the greyish sodium propoxy sucrose powder (3.4 atoms sodium per sucrose molecule) upon removal of the excess solvent by drying as above (Example I).

Various modifications may be made in the present invention without departing from the spirit or scope thereof, and it is to be understood that we limit ourselves only as defined in the appended claims.

We claim:

1. Sodium octakis (2-hydroxy propyl) sucrose compounds wherein a sodium atom replaces the active hydrogen atom of the hydroxy group in from one to eight of the secondary hydroxy propyl radicals of the octakis (2-hydroxy propyl) sucrose.

2. Sodium alcoholate of octakis (2-hydroxy propyl) sucrose wherein the number of active hydrogen atoms of the secondary propyl alcoholic hydroxy groups in said alcoholate have been replaced, on an equivalent weight basis with about 3.4 atoms of sodium per octakis (2-hydroxy propyl) sucrose molecule.

3. Mono-sodium alcoholate of octakis(2-hydroxy-propyl)sucrose.

4. Tetra-sodium alcoholate of octakis(2-hydroxypropyl)sucrose.

5. Octa-sodium alcoholate of octakis(2-hydroxy-propyl) sucrose.

References Cited in the file of this patent

UNITED STATES PATENTS

| | | |
|---|---|---|
| 2,143,855 | Bass | Jan. 17, 1939 |
| 2,609,368 | Gaver | Sept. 2, 1952 |
| 2,680,738 | Laughlin | June 8, 1954 |
| 2,671,780 | Gaver et al. | Mar. 9, 1954 |
| 2,903,487 | Coffield | Sept. 8, 1959 |
| 2,908,681 | Anderson | Oct. 31, 1959 |